United States Patent [19]
Chae

[11] Patent Number: 5,816,970
[45] Date of Patent: Oct. 6, 1998

[54] SEMICONDUCTOR FABRICATING APPARATUS WITH REMOTE BELT TENSION SENSOR

[75] Inventor: Hee-Sun Chae, Suwon, Rep. of Korea

[73] Assignee: Samsung Electronics Co., Ltd., Suwon, Rep. of Korea

[21] Appl. No.: 773,884

[22] Filed: Dec. 26, 1996

[51] Int. Cl.[6] .................................................. F16H 7/22
[52] U.S. Cl. .......................................... 474/101; 474/102
[58] Field of Search ............................ 474/18, 101–103, 474/273

[56] References Cited

U.S. PATENT DOCUMENTS

| | | | |
|---|---|---|---|
| 4,088,036 | 5/1978 | Hillman | 474/18 X |
| 4,117,718 | 10/1978 | Hayward | 73/52 |
| 4,174,641 | 11/1979 | Hillman | 474/18 X |
| 4,558,660 | 12/1985 | Nishizawa et al. | 118/725 |
| 5,214,448 | 5/1993 | Venthem | 474/117 X |
| 5,235,400 | 8/1993 | Terasawa et al. | 356/237 |

Primary Examiner—Roger J. Schoeppel
Attorney, Agent, or Firm—Jones & Volentine, L.L.P.

[57] ABSTRACT

The present invention relates to a semiconductor fabricating apparatus having an electrical system for transmitting a rotatory power through a belt of a motor to a pulley. The semiconductor fabricating apparatus having an electrical system of the present invention includes a sensor disposed in the vicinity of the belt for detecting a distance between the sensor and the belt and generating an electrical signal corresponding to a detected distance; an amplifier for amplifying the electrical signal to generate an amplified voltage; an analog-to-digital converter for converting the amplified voltage into a digital signal; and a controller for comparing the digital signal with a reference signal and determining whether the belt is loose on the pulley so as to generate a control signal. When the belt deviates out of the pulleys during the process, the loose belt makes the pulleys run idle, the belt cuts off, or the rotation of the motor stops, the present invention helps an operator recognize such an unexpected abrupt situation and take an appropriate action to solve the above problems at once.

3 Claims, 2 Drawing Sheets

SEMICONDUCTOR FABRICATING APPARATUS WITH REMOTE BELT TENSION SENSOR

FIELD OF THE INVENTION

The present invention relates to a semiconductor fabricating apparatus, and more particularly to a semiconductor fabricating apparatus having an electrical system for transmitting a rotatory power through a motor belt to a driven pulley.

BACKGROUND OF THE INVENTION

FIG. 1 shows a conventional semiconductor fabricating apparatus having a HEPA filter (high efficiency particles air filter) system. In FIG. 1, reference numeral 1 represents a hermetically sealed space (i.e., a process chamber) in which semiconductor wafers are placed. A tube 2 is provided to supply a highly pure air into the sealed space 1. A motor 10 is provided with a rotating shaft 11 whose one end is coupled with a driving pulley 11. This driving pulley 11 is rotated with the rotating shaft 11. A driven pulley 21 is provided to permit a fan 20 to rotate. When this fan 20 is rotated, the highly pure air is supplied into the space 1. A belt 30 is coupled between the driving pulley 11 and the driven pulley 21 so as to transmit a rotatory power of the motor 10 to the fan 20 through the pulleys 11 and 21.

In the apparatus having the above construction, however, when the belt 30 deviates out of the pulleys 11 and 21, the pulleys run idle due to a loosening of the belt, the belt cuts off, or the rotation of the motor stops, and the sealed space 1 can not be maintained in a preset highly pure condition. The apparatus is not provided with means for detecting an incomplete state in the sealed space and generating an alarm on the basis of a detected result. So, an operator can not recognize such an unexpected abrupt situation in the sealed space as soon as possible.

SUMMARY OF THE INVENTION

It is therefore an object of the present invention to provide a semiconductor fabricating apparatus capable of detecting when a belt coupled between a driving pulley of a motor and a driven pulley of an object is loose, deviates out of the pulley, or cuts off in an electrical system for transmitting a rotatory power of the motor through the belt to the driven pulley.

It is another object of the present invention to provide a semiconductor fabricating apparatus capable of detecting an abnonnal coupling state of a power transmitting belt with a pulley and determining whether a process chamber is at an abnormal state.

In order to accomplish this object, a semiconductor fabricating apparatus of the present invention has an electrical system for transmitting a rotatory power of a motor through a belt to a driven pulley. The apparatus comprises a sensor disposed in the vicinity of said belt, for detecting a distance between said sensor and said belt and generating an electrical signal corresponding to a detected distance; an amplifier for amplifying said electrical signal to generate an amplified voltage; an analog-to-digital converter for converting said amplified voltage into a digital signal; a controller for comparing said digital signal with a reference signal and determining whether said belt is loose on said pulley, so as to generate a control signal; and mean for notifying an operator of a belt loosened condition in response to said control signal.

BRIEF DESCRIPTION OF THE DRAWINGS

This invention may be understood and its object will become apparent to those skilled in the art by reference to the accompanying drawing as follows.

DESCRIPTION OF PREFERRED EMBODIMENTS

Figure 1:
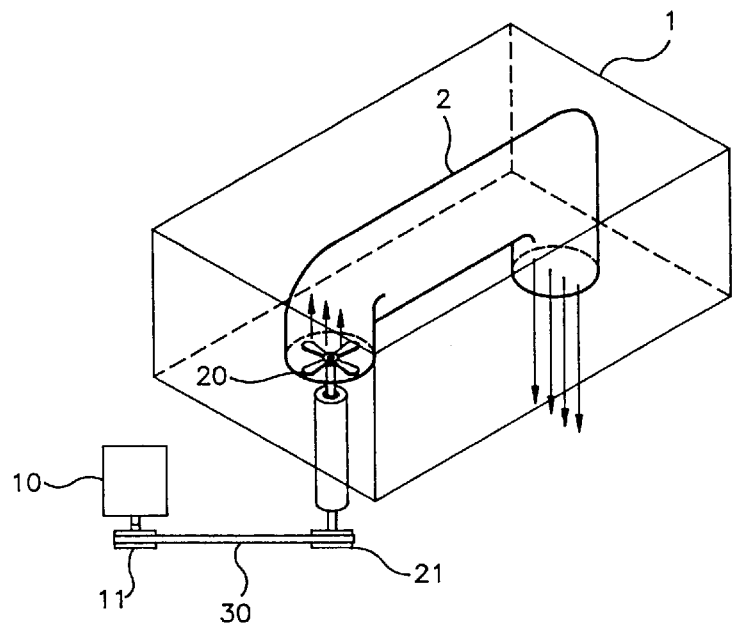
FIG. 1 is a schematic view of a conventional semiconductor fabricating apparatus having an electrical system for transmitting a rotatory power.
Figure 2:
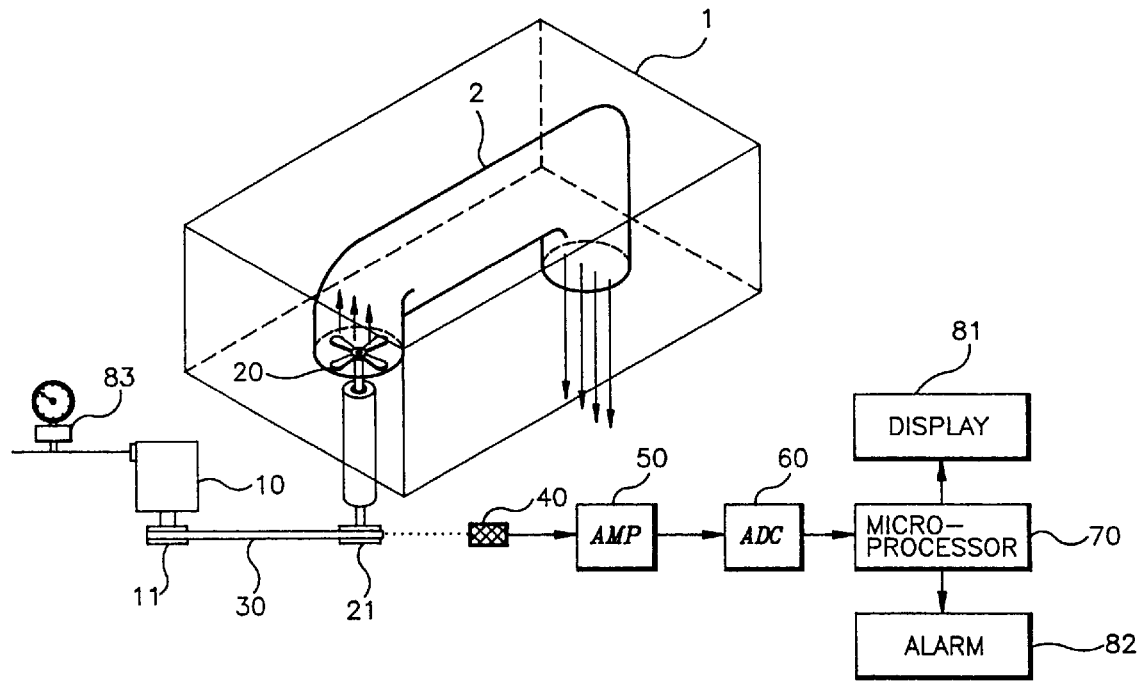
FIG. 2 is a schematic view of a semiconductor fabricating apparatus having an electrical system for transmitting a rotatory power in accordance with the present invention.

Fig.2 shows a semiconductor fabricating apparatus having an electrical system in accordance with a preferred embodiment of the present invention. The electrical system is provided, for example, to supply a highly pure air in a process chamber 1, and has a motor 10 for generating a rotatory power, a driving pulley 11 coupled with a shaft of the motor, a fan 20 for supplying a highly pure air through a tube 2 in the process chamber 1, and a driven pulley 21 for driving the fan 20 to be rotated. A belt 30 is provided to transmit the rotatory power from the driving pulley 11 to the driven pulley 21.

A distance detecting sensor 40, for example, a capacitance type of proximity sensor, is disposed in the vicinity of the belt 30 so as to detect a distance between the sensor 40 and the belt 30. The detected distance signal is converted into an electrical signal corresponding to the detected distance by means of the sensor 40. This electrical signal is provided to an amplifier 50 to be amplified. The amplified voltage is converted into a digital signal by means of an analog-to-digital converter 60. This digital signal indicative of a distance between the sensor 40 and the belt 30 is provided to a microprocessor 70. The microprocessor 70 then determines whether a power transfer through the belt 30 is abnormal. If so, the microprocessor outputs a control signal through its output ports. The control signal is applied to a display 81 and/or an alarm 82. An operator can immediately recognize an unexpected abrupt situation (i.e., an abnormal state) of the process chamber 1. Accordingly, the operator can manipulate the abnormal state into a normal state as soon as possible.

In this embodiment, the proximity sensor 40 functions as one electrode of a virtual capacitor and the pulley 11 or 21 of a sensed object functions as the other electrode thereof. So, a capacitance of the virtual capacitor is changed in accordance with a distance between the object and the proximity sensor 40. The sensor thus is called a capacitance type of proximity sensor. The sensor 40 may detect a distance of several to several scores of millimeters. Also, this sensor is mainly used as a control sensor for industrial robot or automatic equipment in this field.

If the belt 30 deviates out of the pulley 11 or 21 or cuts off, a distance between the two electrodes of the virtual capacitor, i.e., the sensor 40 and the pulley 11 or 21, is increased, but a capacitance therebetween is reduced. As a result, the proximity sensor 40 outputs a voltage corresponding to the reduced capacitance, for example, a relatively low voltage. If the belt is loose, a distance between the two electrodes is reduced, but a capacitance therebetween is increased. Thus the sensor 40 outputs a voltage corresponding to the increased capacitance, for example, a relatively high voltage.

Hereinafter, an operation of the microprocessor will be described in detail with reference to FIG. 3.

Figure 3:
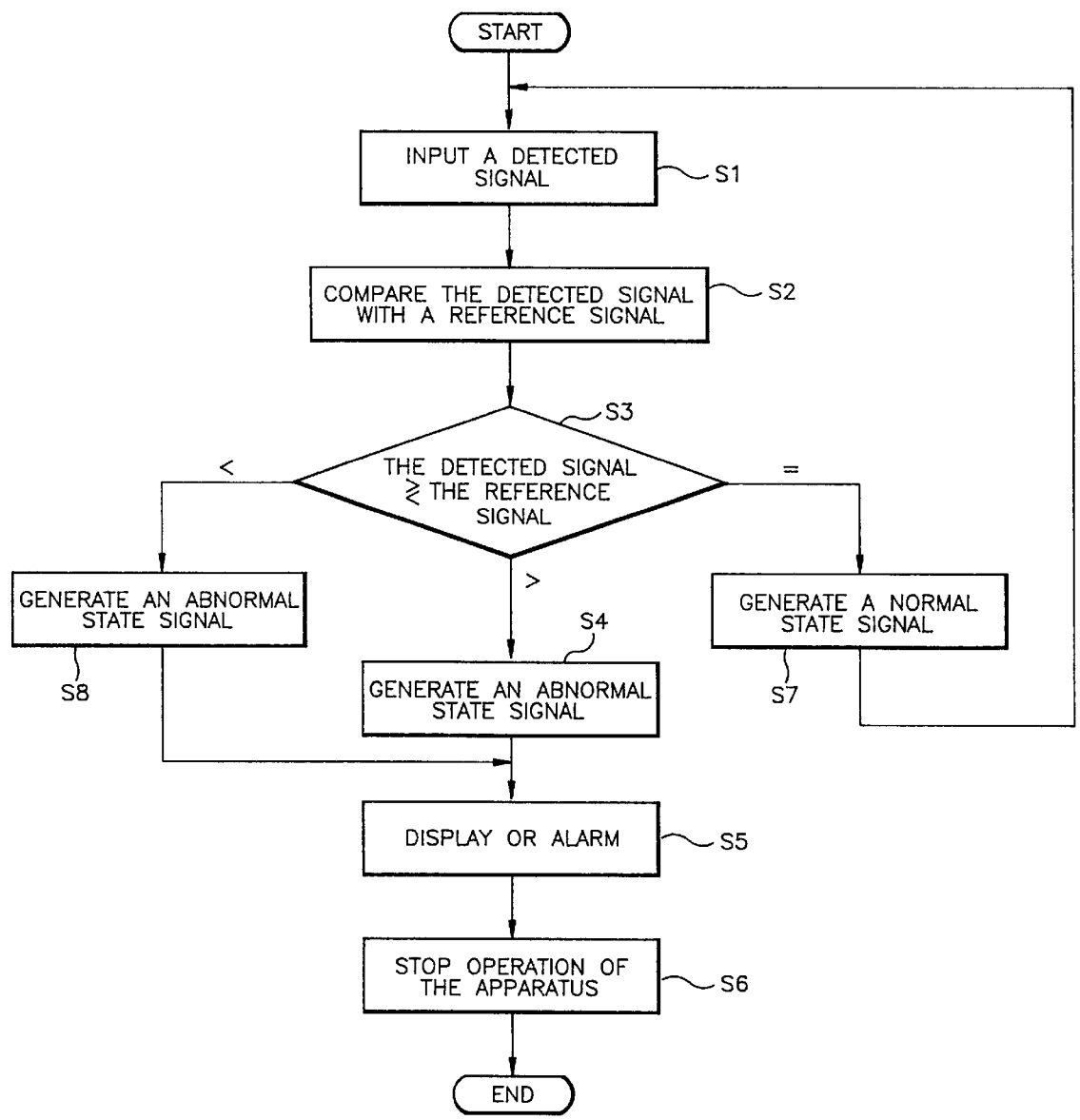
FIG. 3 is a flow chart showing the process steps performed in the microprocessor shown in FIG. 2.

Referring to FIG. 3, the microprocessor 70 receives a digital signal indicative of a distance between the sensor 40 and the belt 30 at step S1. Then the control proceeds to step S2, wherein the microprocessor 70 compares the digital signal with a reference signal. The reference signal is indicative of a normal coupling state of the belt 30 with the pulley. At step S3, if the digital signal is greater or less than the reference signal, the control proceeds to step S4 or S8, wherein the microprocessor generates a first control signal indicative of an abnormal state of the process chamber 1 through an output port thereof. If the digital signal is equal to the reference signal, the control proceeds to step S7, wherein the microprocessor generates a second control signal indicative of a normal state of the process chamber and then proceeds again to step S 1. When the digital signal is greater than the reference signal, i.e., when the belt 30 deviates out of the pulley 11 or 21, the first control signal generated from the microprocessor 70 indicates that a distance between the belt and the sensor is increased. When the digital signal is less than the reference signal, i.e., when the belt 30 is loose, the first control signal indicates that a distance between the belt and the sensor is reduced.

On the other hand, by the first control signal, the display 81 and/or the alarm device 82 is operated to display and generate a warning alarm signal. The control then proceeds to step S6, wherein an operation of the apparatus stops.

As stated above, the microprocessor 70 detects a distance between the pulley and the sensor and determines whether the process chamber is at an abnormal state. If the process chamber is at an abnormal state, an operator can recognize the abnormal sate by a warning alarm. Thus, a belt loosened condition can be detected by the apparatus in response to the first control signal.

In addition, the apparatus further has a current checking device 83 (e.g., a current meter) as shown in FIG. 2. The operator can check whether the current is normally supplied to the motor 10 through the current meter 83 at any time.

In a modification of the present invention, an amount of current flowing to the motor is detected by the current meter 83 and is provided to the ADC 60 to be converted into a digital signal. The microprocessor 70 then compares the digital signal with a preset reference signal and determines whether the belt is loose on the pulley, deviates out of the pulley, or cuts off.

The present invention is not limited to the only above described preferred embodiment but can applied to any kind of a semiconductor fabricating apparatus having electrical system for transmitting a rotatory power through a belt of a motor.

What is claimed is:

1. A semiconductor fabricating apparatus having an electrical system for transmitting a rotatory power through a belt of a motor to a driven pulley, comprising:

a sensor disposed in the vicinity of said belt, for detecting a distance between said sensor and said belt and generating an electrical signal corresponding to a detected distance;

an amplifier for amplifying said electrical signal to generate an amplified voltage;

an analog-to-digital converter for converting said amplified voltage into a digital signal;

a controller for comparing said digital signal with a reference signal and determining whether said belt is loose on said pulley, deviates out of said pulley, or cuts off, so as to generate a control signal; and means for notifying an operator of a belt loosed condition in response to said control signal.

2. The semiconductor fabricating apparatus of claim 1, wherein said sensor is a proximity sensor of capacitance type.

3. The semiconductor fabricating apparatus of claim 1, further comprising means for detecting an amount of current supplied to said motor and generating an electrical signal corresponding to a detected current amount.

* * * * *